(12) United States Patent
Likes et al.

(10) Patent No.: US 7,870,275 B1
(45) Date of Patent: Jan. 11, 2011

(54) COMMUNICATION SCHEME-INDEPENDENT INFRASTRUCTURE

(75) Inventors: Donald C. Likes, Austin, TX (US); Russell C. Brown, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 2935 days.

(21) Appl. No.: 10/085,965

(22) Filed: Feb. 28, 2002

(51) Int. Cl.
*G06F 3/00* (2006.01)

(52) U.S. Cl. .................. 709/230; 709/228; 709/245; 719/311; 719/313

(58) Field of Classification Search .............. 709/228, 709/230, 236, 246; 719/311, 315
See application file for complete search history.

(56) References Cited

U.S. PATENT DOCUMENTS

| | | | | |
|---|---|---|---|---|
| 5,182,748 A | * | 1/1993 | Sakata et al. ............... | 370/466 |
| 5,491,693 A | * | 2/1996 | Britton et al. ............... | 709/230 |
| 5,680,551 A | * | 10/1997 | Martino, II ................. | 709/226 |
| 5,706,211 A | * | 1/1998 | Beletic et al. ............... | 709/206 |
| 5,710,908 A | * | 1/1998 | Man .......................... | 709/230 |
| 5,793,771 A | * | 8/1998 | Darland et al. .............. | 370/467 |
| 5,991,802 A | * | 11/1999 | Allard et al. ................ | 709/219 |
| 6,151,390 A | * | 11/2000 | Volftsun et al. ............. | 379/229 |
| 6,334,122 B1 | | 12/2001 | Brown .......................... | 707/2 |
| 6,349,341 B1 | | 2/2002 | Likes ......................... | 709/249 |
| 6,397,225 B1 | | 5/2002 | Brown et al. ............. | 707/104.1 |
| 6,519,653 B1 | * | 2/2003 | Glass ......................... | 709/202 |

* cited by examiner

*Primary Examiner*—Kevin Bates
(74) *Attorney, Agent, or Firm*—Hamilton & Terrile, LLP; Stephen A. Terrile

(57) ABSTRACT

The present invention provides a communication infrastructure that allows application programs within a software system to dynamically use services, such as receiving and transmitting messages, through a common application program interface (API). The communication infrastructure allows the specific communication schemes that are being used to be isolated from the application programs such that the application programs are not dependent upon a particular communication scheme.

23 Claims, 15 Drawing Sheets

Send Message

Register to Receive Message

Send Message

Register to Receive Message

Send Message

Register to Receive Message

Class Diagram

RMI Register to Receive Message

RMI Send Message

COMMUNICATION SCHEME-INDEPENDENT INFRASTRUCTURE

BACKGROUND OF THE INVENTION

1. Field of the Invention

The present invention relates generally to the field of software systems, and more particularly, to enabling a software application adapted to communicate using a first communication scheme to be changed to communicate using a second communication scheme without extensive revisions to the software application programming code.

2. Description of the Related Art

Complex software systems are pervasive in today's technically-advanced computing environments. Many software systems are comprised of a number of application programs, also referred to as applications, that are distributed among different computer systems and communicate via a network. These application programs often reside on and are executed by their own host computers. The host computers are typically interconnected so that the application programs can communicate with one another over the network.

To simplify software development and system maintenance, applications within a given software system typically are written in the same programming languages and communicate using a common protocol. As used herein, the term "protocol" is used to characterize the handshaking and forming of connections for two applications to communicate with each other. Examples of protocols are Internet Protocol (IP), Internet Inter-ORB protocol (IIOP) and user datagram protocol (UDP). The term "language" is used to characterize the encoding of data into a particular format before sending the data across a communication channel according to a particular protocol. An example of a language is Java, which can format data as Java objects. The term "communication scheme," as used herein, refers to either a protocol, a language, or a combination of a language and a protocol that is an application to communicate. An example of a communication scheme is Common Object Request Broker Architecture (CORBA), which encodes data as CORBA objects and transmits the CORBA objects using IIOP.

In most software systems, each application is written to include communication scheme-specific programming code to perform communication tasks. To change the communication scheme with which a given application communicates typically requires extensive revisions to the software application programming code. When an entire software system with numerous application programs is to be changed to use another communication scheme, in some situations it may be less expensive to rewrite the software system itself rather than to remove and replace the communication scheme-specific code in each of the application programs.

What is needed is a communication infrastructure that applications programs can use to handle communication scheme-specific tasks. The communication infrastructure should enable individual application programs using the infrastructure to be written independently of the underlying communication scheme, without the need for code within the application to handle the communication scheme. Ideally, the solution would provide the ability to develop and enhance software systems that support multiple communication schemes, without the need to change the core application program code for each application that is part of the software system.

SUMMARY OF THE INVENTION

The present invention provides a communication infrastructure that allows application programs within a software system to dynamically use services, such as receiving and transmitting messages, through a common application program interface (API). The communication infrastructure allows the specific communication schemes that are being used to be isolated from the application programs such that the application programs are not dependent upon a particular communication scheme.

In one form, the invention includes a method that includes obtaining a message from a first component of a software system, identifying a module to handle scheme-specific communication of the message, and using the module for communicating the message from the first component to a second component of the software system.

In another form, the invention includes a software system including a common interface to communicate between first and second components of a software system and a communication scheme handler to identify a module to handle scheme-specific communication between the first and second components.

In yet another form, the invention includes a computer program product including obtaining instructions to obtain a message from a first component of a software system, identifying instructions to identify a module to handle scheme-specific communication of the message, and using instructions to use the module to communicate the message from the first component to a second component of the software system. The computer program product further includes a computer-readable medium to store the obtaining instructions, the identifying instructions and the using instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 2A shows the actions involved in sending a message from one component to another. FIG. 2B shows the actions involved in registering a component to receive messages.

DETAILED DESCRIPTION

The following is intended to provide a detailed description of an example of the invention and should not be taken to be limiting of the invention itself. Rather, any number of variations may fall within the scope of the invention which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention provides a communication infrastructure that allows application programs within a software system to dynamically use services, such as receiving and transmitting messages, through a common application program interface (API). The communication infrastructure allows the specific communication schemes that are being used to be isolated from the application programs such that the application programs are not dependent upon a particular communication scheme.

Figure 1:
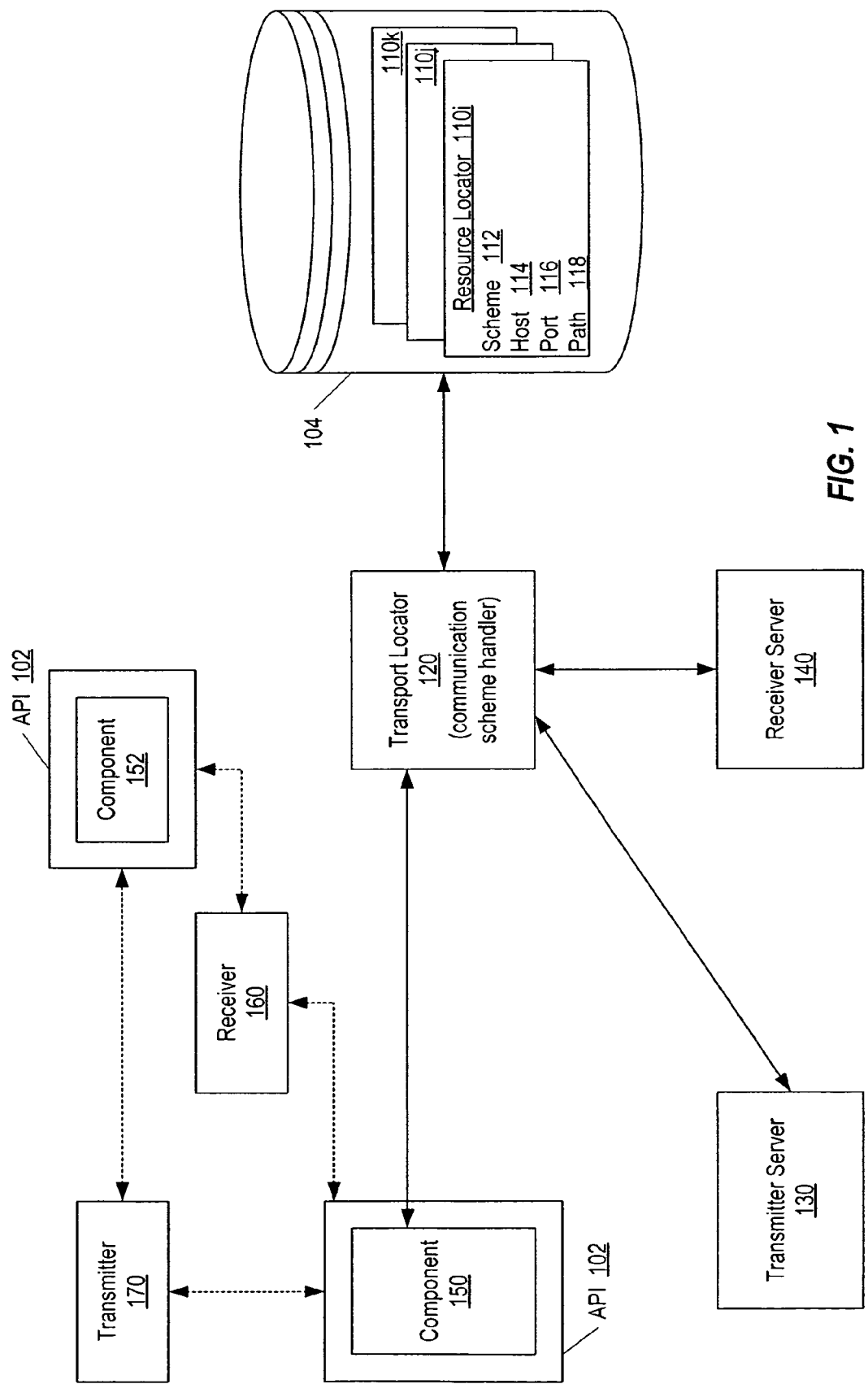
FIG. 1 is an example of one embodiment of modules of a software system having a communication infrastructure according to the present invention.

FIG. 1 is an example of an embodiment of a software system using the communication infrastructure of the present invention. The modules shown in FIG. 1 provide a foundation for the multi-scheme communication infrastructure, although a software system using the infrastructure may include a different number of modules or other types of modules. An object-oriented implementation of the invention is described with reference to these Figures, although the invention is not so limited and may be implemented using other design techniques. The term object used with reference to the object-oriented implementation is used interchangeably with the term module.

Application programming interface (API) 102 is a common application programming interface (API) used by each component of the software system, of which two are shown, component 150 and component 152. Providing a common interface such as API 102 enables the code for components 150 and 152 to exclude code written specifically for the communication scheme and to use the common API 102 to handle communication scheme-specific functions. If changes to the communication scheme occurs, the communication scheme-specific code is isolated from the application programs, the code for which remains unchanged. While the box for API 102 is shown around components 150 and 152, no containment relationship is implied. The box API 102 represents that each of components 150 and 152 communicate using API 102.

In the object-oriented implementation shown in FIG. 1, communication is performed using objects of the following types:

Resource Locator 110
Transport Locator 120
Transmitter Server 130
Receiver Server 140

Each of these types of objects has a corresponding class defining the attributes and methods for the object. The class structure for the communication infrastructure is described in further detail below.

To identify the objects that will handle communication between components, the communication scheme to be used must be obtained. In this implementation, data store 104 includes several instances of Resource Locators, designated Resource Locators 110*i*, 110*j* and 110*k*, with one instance for each component of the software system. The term Resource Locator 110*i* is used herein to refer generally to a given instance of a Resource Locator. Note that data store 104 may represent a database, an in-memory data structure, or any other means for storing information.

In one embodiment, each Resource Locator 110*i* specifies the communication scheme 112, host 114 (i.e., network node identifier), port 116 and path 118 necessary to communicate with a particular component of the software system. An example format of a Resource Locator 110*i* is provided below:

rmi://host:port/path where rmi indicates the communication scheme 112 (Java Remote Method Invocation (RMI), which encodes data as Java objects and uses TCP/IP as the underlying transport protocol) for communicating with the associated module. Host 114 indicates a network node name for a host computer for the associated module, port 116 indicates a port identifier on the host computer for communicating with other modules of the software system, and path indicates a path 118 to a particular file location for the module.

In one embodiment, a component wishing to communicate with another component, such as component 150, provides an identifier for the other component, such as component 152. The identifier preferably corresponds to the Resource Locator 110*i* for the other component and is provided to Transport Locator 120.

While a given Resource Locator 110*i* provides similar information to that of a Uniform Resource Locator (URL) as commonly used on the Internet, the given Resource Locator 110*i* may include other information and/or functionality. A URL is an example of an embodiment of Resource Locator 110*i*.

Transport Locator 120 manages the communication infrastructure to ensure that messages are sent to the intended recipient according to the correct communication scheme, thereby serving as a communication scheme handler. On startup, Transport Locator 120 obtains configuration information, which identifies the communication schemes used within the software system. Such configuration information may be stored in data store 104, but the invention is not limited to such an implementation. In the object-oriented embodiment of the invention shown in FIG. 1, Transport Locator 120 is instantiated as an object and determines the classes that support each communication scheme. In one embodiment, the communication scheme required to communicate with a particular component can be obtained directly from the Resource Locator 110*i* for that component, as Resource Locator 110*i* includes the communication scheme 112 with which the module communicates. In the example of FIG. 1, each Resource Locator 110*i* (including the communication scheme 112) is stored in data store 104, along with the scheme 112, host 114, port 116, and path 118. Other embodiments may use a different technique to make the communication scheme for each component easily accessible by Transport Locator 120.

Transport Locator provides information to components 150 and 152 that enables them to communicate despite incompatible communication schemes. This functionality is explained in further detail below.

Transmitter Server 130 provides an abstract representation of the client, or sender of messages, in a client/server relationship. Transport Locator 120 loads and eventually uses a communication scheme-specific class to instantiate an object, such as Transmitter 170, to send messages.

A module that wishes to operate as a server, or receiver of messages, defines a Resource Locator 110*i* to identify the specific communication scheme, host, port and path necessary for other modules to reach it. Note that the module can specify defaults for these attributes, thereby further abstracting the communication from the internal programming code for the module. The module calls Transport Locator 120, providing its own Resource Locator 110*i*, indicating via a registration message that the requesting module wishes to become a server. Transport Locator 120 then consults configuration information, for example in data store 104, and identifies a class that can support the communication scheme indicated by Resource Locator 110*i* by calling Receiver Server 140. Receiver Server 140 obtains a receiver object to perform the scheme-specific communication to send the registration message. To complete the scheme-specific communication, a reply message is provided back to the module requesting to be a server that it has been established as a server. The reply message is provided via a callback function established when the requesting module requests to become a server.

A module that wishes to send a message to another module defines a Resource Locator 110*i* to identify the specific communication scheme, host, port and path for the module with which it wishes to communicate. The module's code can specify defaults for these attributes, thereby further abstracting the communication from the internal programming code for the module. The application calls Transport Locator 120, providing a Resource Locator 110*i* for the module to receive the message.

Transport Locator 120 accesses configuration information and identifies a class to support this type of communication and obtains a transmitter object corresponding to the class. Scheme-specific communication is initiated by the transmitter object to send the message. To complete the scheme-specific communication, a reply message is provided back to the module sending the message indicating whether the message was sent successfully.

As noted above, Transport Locator 120 provides Components 150 and 152 with the ability to communicate with each other despite having incompatible communication schemes. The dotted lines between components 150 and 152, Transmitter 170, and Receiver 160 indicate that the communication between them is not direct and that Components 150 and 152 have no direct knowledge of Transmitter 170 and Receiver 160. Instead, Transport Locator 120 provides to components 150 and 152 a reference to the appropriate object, such as Transmitter 170 or Receiver 160, whenever the component wishes to send or register to receive messages.

Figure 2A:
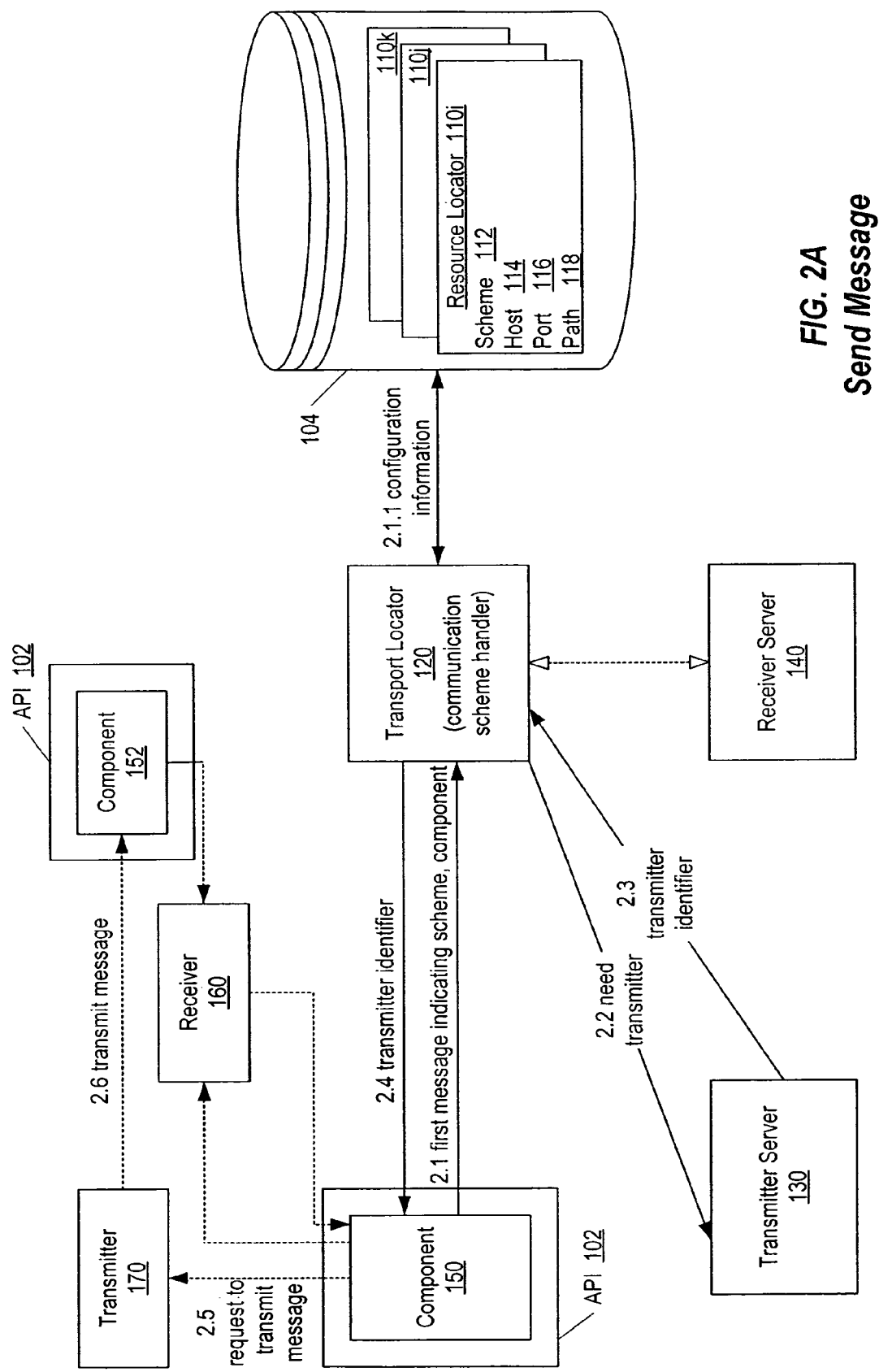
FIGS. 2A and 2B show communication of messages between the modules of the software system described with reference to FIG. 1.
Figure 2B:
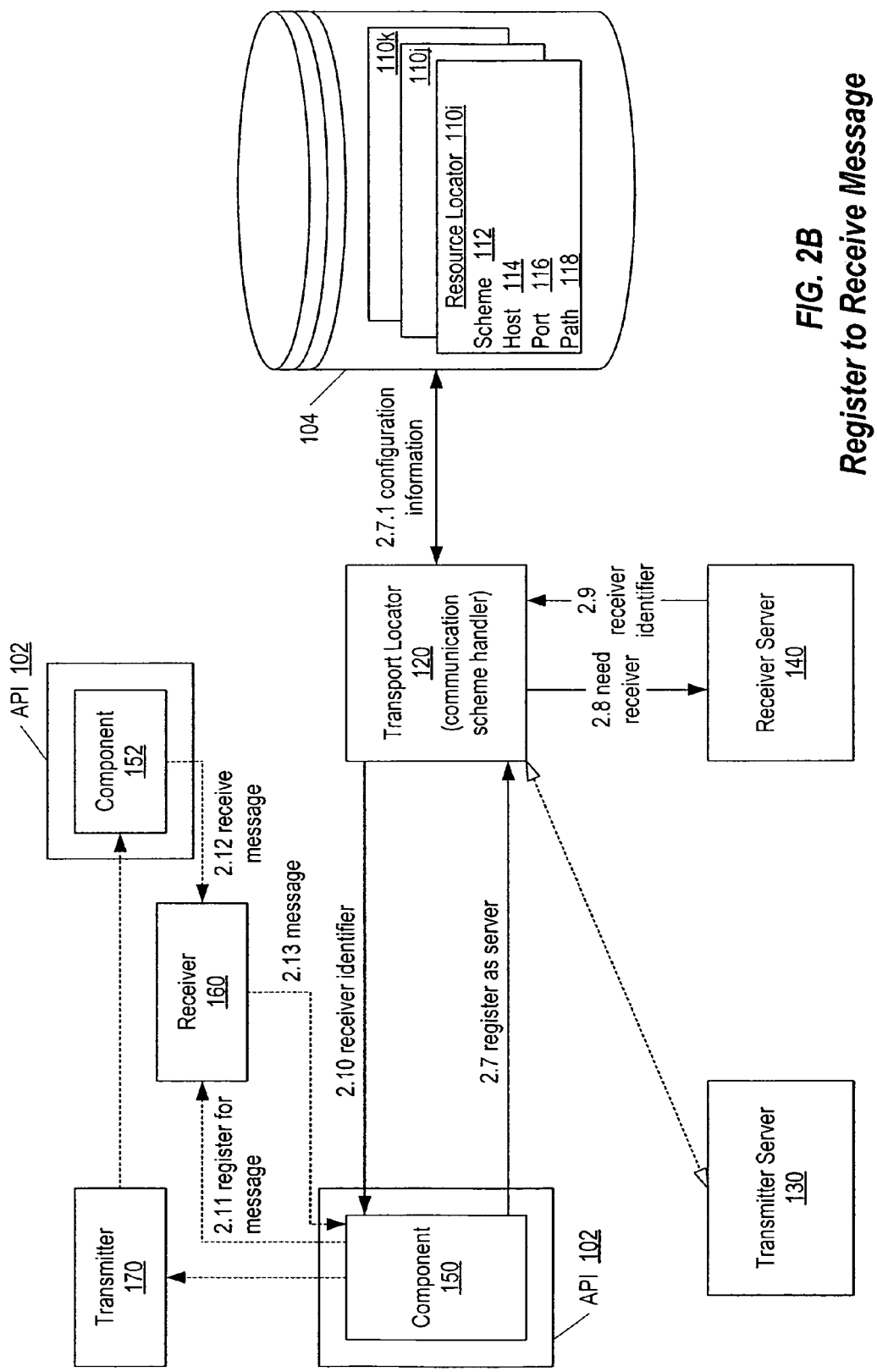

FIGS. 2A and 2B shows communication of messages between the modules of the software system described with reference to FIG. 1. FIG. 2A shows the actions involved in sending a message from Component 150 to Component 152. In action 2.1, Component 150 sends a first message indicating a communication scheme with which the recipient of the message communicates and an identification of the component, here Component 152, to receive the message. In action 2.1.1, Transport Locator 120 obtains configuration information from data store 104, including a Resource Locator 110I for the component to receive the message. In action 2.2, Transport Locator 120 calls Transmitter Server 130 to indicate that the name of a transmitter to communicate the message is needed. In action 2.3, Transmitter Server 130 sends an identifier for an available transmitter to send the message to the target component. In this example, the identifier returned is an identifier for Transmitter 170. Transport Locator 120 returns the transmitter identifier to Component 150. In action 2.5, Component 150 requests Transmitter 170 to transmit the message to Component 152. In action 2.6, Transmitter 170 transmits the message to Component 152.

FIG. 2B shows the messages involved when Component 150 registers to become a server. In action 2.7, Component 150 sends a second message indicating a communication scheme and indicating that Component 150 would like to receive a message. In action 2.8, Transport Locator 120 requests a receiver name from Receiver Server 140, and Receiver Server 140 provides a receiver identifier in action 2.9. In this example, the Receiver identifier corresponds to Receiver 160. In action 2.10, Transport Locator 120 provides the receiver identifier for Receiver 160 to Component 150. In action 2.11, Component 150 requests to receive a message from Receiver 160. Receiver 160 obtains a message from Component 152 in action 2.12. In action 2.13, Receiver 160 provides the message to Component 150.

Figure 3:
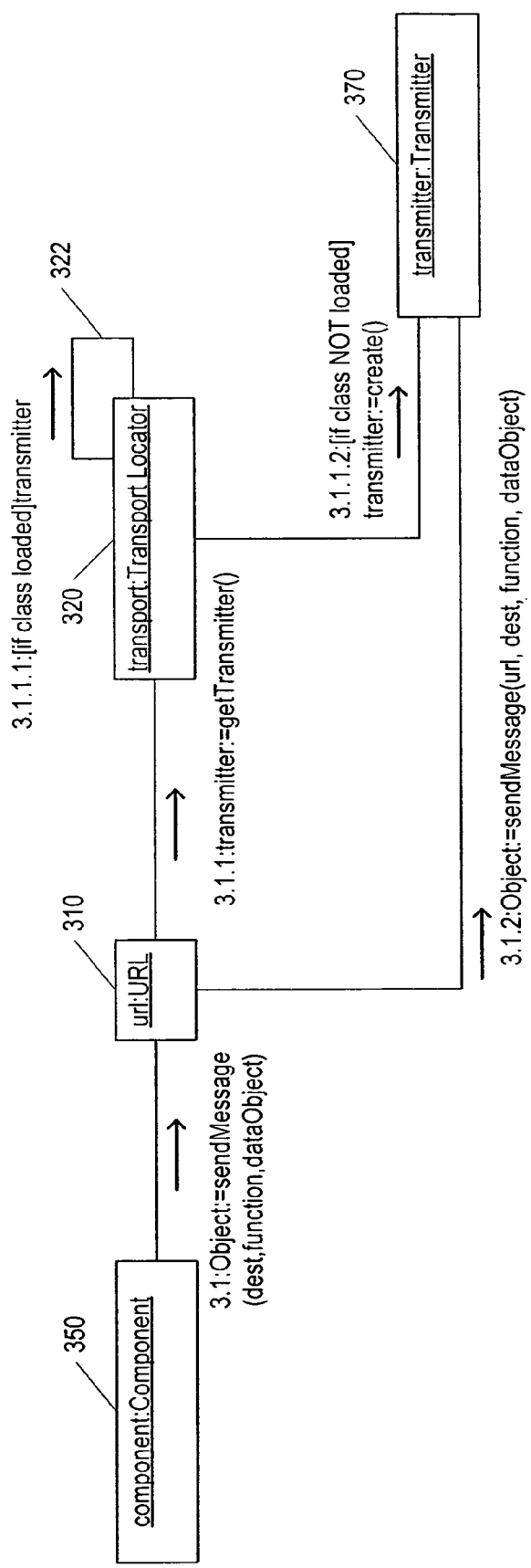
FIG. 3 is a collaboration diagram showing sending a message from a component to other modules of the software system of FIGS. 1 and 2.

FIG. 3 is a collaboration diagram showing sending a message from a component to other modules of the software system described above. In action 3.1, component 350, representing a given component of the software system, sends a message. The message includes a destination, usually in the form of a Resource Locator 110*i*, but that may instead be in the form of a call to a service; a function to be performed; and a data object. The data object is in a generic format suitable for common interface, such as API 102 of FIG. 1, and is not encoded according to a specific communication scheme. The message is sent to url 310, which is an instantiation of a URL class, where the url corresponds to an instance of a Resource Locator 110i corresponding to component 350. The message sent from component 350 to url 310 may be considered to be communicated via a common interface, such as API 102 of FIG. 1.

In action 3.1.1, url 310 sends a "getTransmitter" message to Transport Locator 320. Transport Locator 320 determines whether an object has been instantiated to serve as a transmitter according the communication scheme for component 350. In action 3.1.1.1, Transport Locator 320 has determined that a class for a transmitter for the respective communication scheme has been loaded by sending a message to itself, indicated by the relationship line 322. Transport Locator provides a reference to an existing transmitter object back to url 310. In action 3.1.1.2, Transport Locator 320 has determined that the transmitter class has not been loaded and creates a corresponding transmitter object, Transmitter 370, to transmit messages according to the appropriate communication scheme. A reference to the transmitter object, such as Transmitter object 370, is returned back to url 310. The referenced transmitter object implements a common transmitter interface, which is used by all components of the software system to transmit messages and is part of the common interface such as API 102 of FIG. 1. The returned transmitter object is capable of communicating the generic format of messages for API 102 into a format conforming to the communication scheme necessary to send the message to its intended destination. This common transmitter interface is discussed in further detail below.

In action 3.1.2, url 310 sends a message to the referenced transmitter object, such as Transmitter 370, indicating that it is to receive the reply message; a destination for the message, usually in the form of a Resource Locator 110i or a call to a service; a function to be performed; and a data object. The message is transmitted by the transmitter object to its destination according to the communication scheme for the destination.

Figure 4:
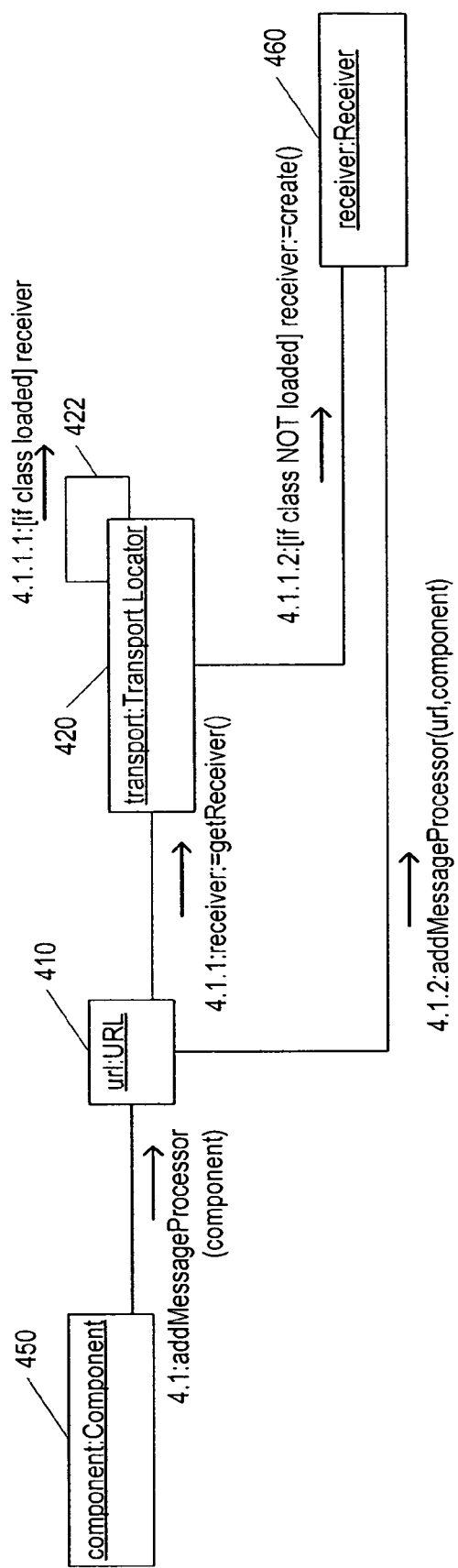
FIG. 4 is a collaboration diagram showing a component registering to receive messages from other modules of the software system described above.

FIG. 4 is a collaboration diagram showing a component module registering to receive messages from other modules of the software system described above. In action 4.1, component module 450, representing a given component module of the software system, sends an addMessageProcessor message, also referred to herein as a registration message. The addMessageProcessor message indicates that the sender wishes to become a server; i.e., to receive messages from other modules in the software system. The addMessageProcessor includes a component object representing component 450, identifying that component 450 is to be added as a server. The addMessageProcessor message is sent to url 410, which is an instantiation of a URL class, where url 410 corresponds to a Resource Locator 110i for component 450.

In action 4.1.1, url 410 sends a "getReceiver" message to Transport Locator 420. Transport Locator 420 determines whether an object has been instantiated to receive registration messages according to the communication scheme required by component 450. In action 4.1.1.1, Transport Locator 420 has determined that a class for the respective communication scheme has been loaded and returns the existing receiver object to url 410. In action 4.1.1.2, Transport Locator 420 has determined that a receiver object has not been instantiated and creates a receiver object, Receiver 460. A receiver object, such as receiver 460, is returned to url 410. The receiver object implements a common receiver transport interface used by all components of the software system to register components as servers. The receiver transport interface can be considered to be a part of the common interface such as API 102 of FIG. 1.

In action 4.1.2, url 410 sends a message to Receiver 460, indicating the url to which a return message should be communicated and the component, here component 450, to be added to a list of available servers for the appropriate communication scheme.

Figure 5:
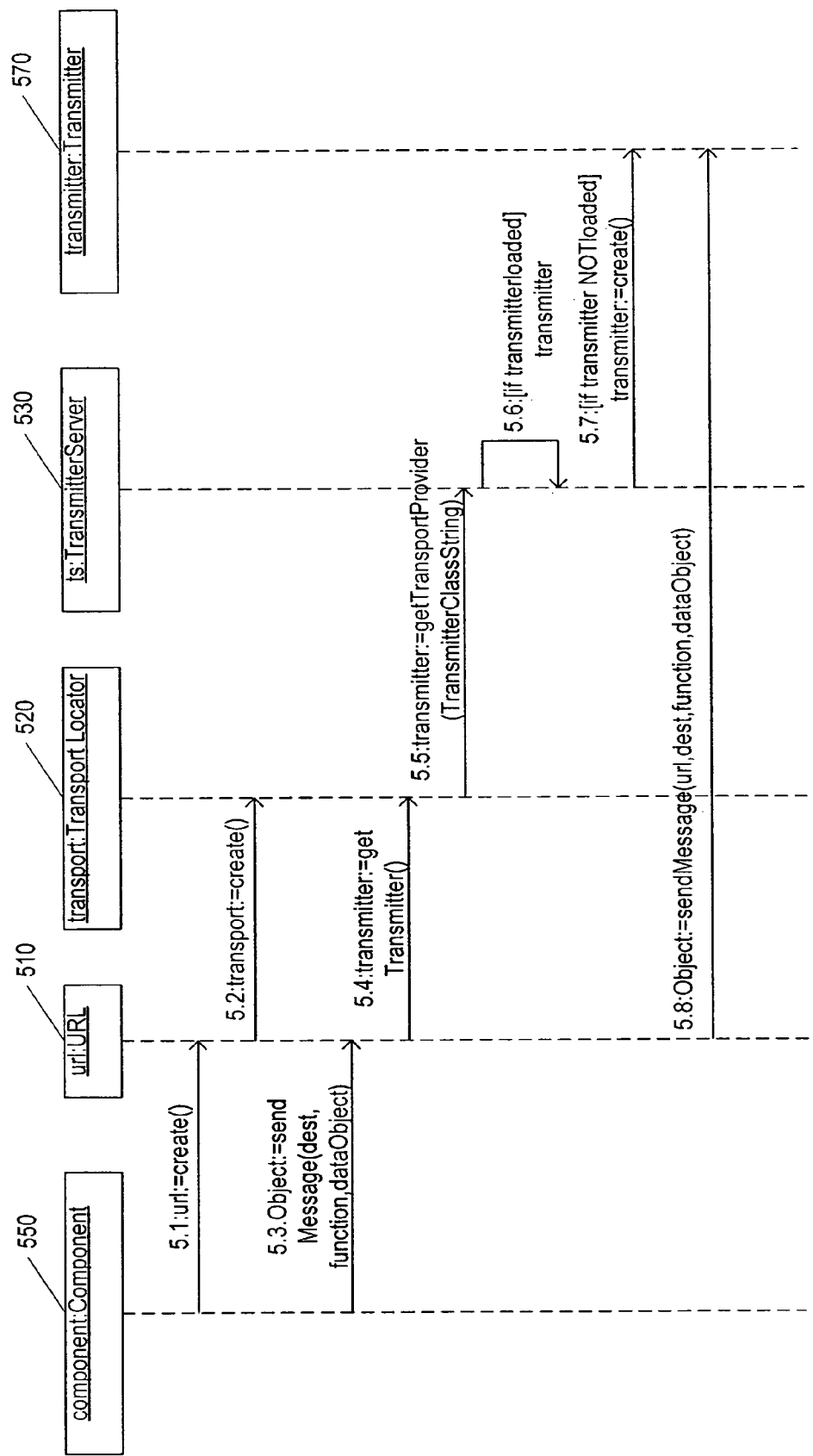
FIG. 5 is a sequence diagram showing sending a message between components of the software system described above.

FIG. 5 is a sequence diagram showing sending a message between modules of the software system described above.

In action 5.1, component 550, representing a given component module of the software system, causes url 510 to be instantiated as an object of a URL class. Url 510 uniquely identifies component 550 within the communication infrastructure of the present invention. Url 510 corresponds to a Resource Locator 110i, or address, for component 550. Under a communication scheme such as CORBA, either Transmitter Server 530 or Transmitter 570 (depending on the implementation) includes an initialization method that registers url 510 with an Object Request Broker, which keeps track of the URL in a registry.

In action 5.2, url 510 causes Transport Locator 520 to be created. In action 5.3, component 550 sends a message to url 510. The message includes a destination, usually in the form of a Resource Locator 110i; a function to be performed; and a data object. The destination provides information regarding the communication scheme necessary to send the message. In this embodiment, the reply to the message is stored in an object, as indicated by the sendMessage command. In other embodiments, the reply may not be stored.

In action 5.4, url 510 requests a transmitter object from Transport Locator 520 by sending a "getTransmitter" message. Transport Locator 520 determines whether an object has been instantiated to serve as a transmitter according to the communication scheme indicated by url 510. Transport Locator 520 determines the class to be instantiated to transmit messages according to the communication scheme. In action 5.5, Transport Locator 520 sends a "getTransport" message to Transmitter Server 530, indicating with the parameter TransmitterClassString the class to be instantiated.

Transmitter Server 530 determines whether a transmitter object has been instantiated for the communication scheme required by component 550. In action 5.6, Transmitter Server 530 has determined that a transmitter has been instantiated and provides an existing transmitter object back to Transport Locator 520 and url 510. In action 5.7, Transmitter Server 530 has determined that no transmitter has been instantiated, and creates a transmitter object, Transmitter 570. A transmitter object, such as transmitter 570, is returned back to Transport Locator 520 and url 510. The transmitter object can transmit messages according to the communication scheme for component 550.

In action 5.8, url 510 sends a message to the returned transmitter object, such as Transmitter 570. The message includes url 510; a destination for the message, usually in the form of a Resource Locator 110i or a call to a service; a function to be performed; and a data object. A reply message referencing the transmitter object is provided back to url 510.

Figure 6:
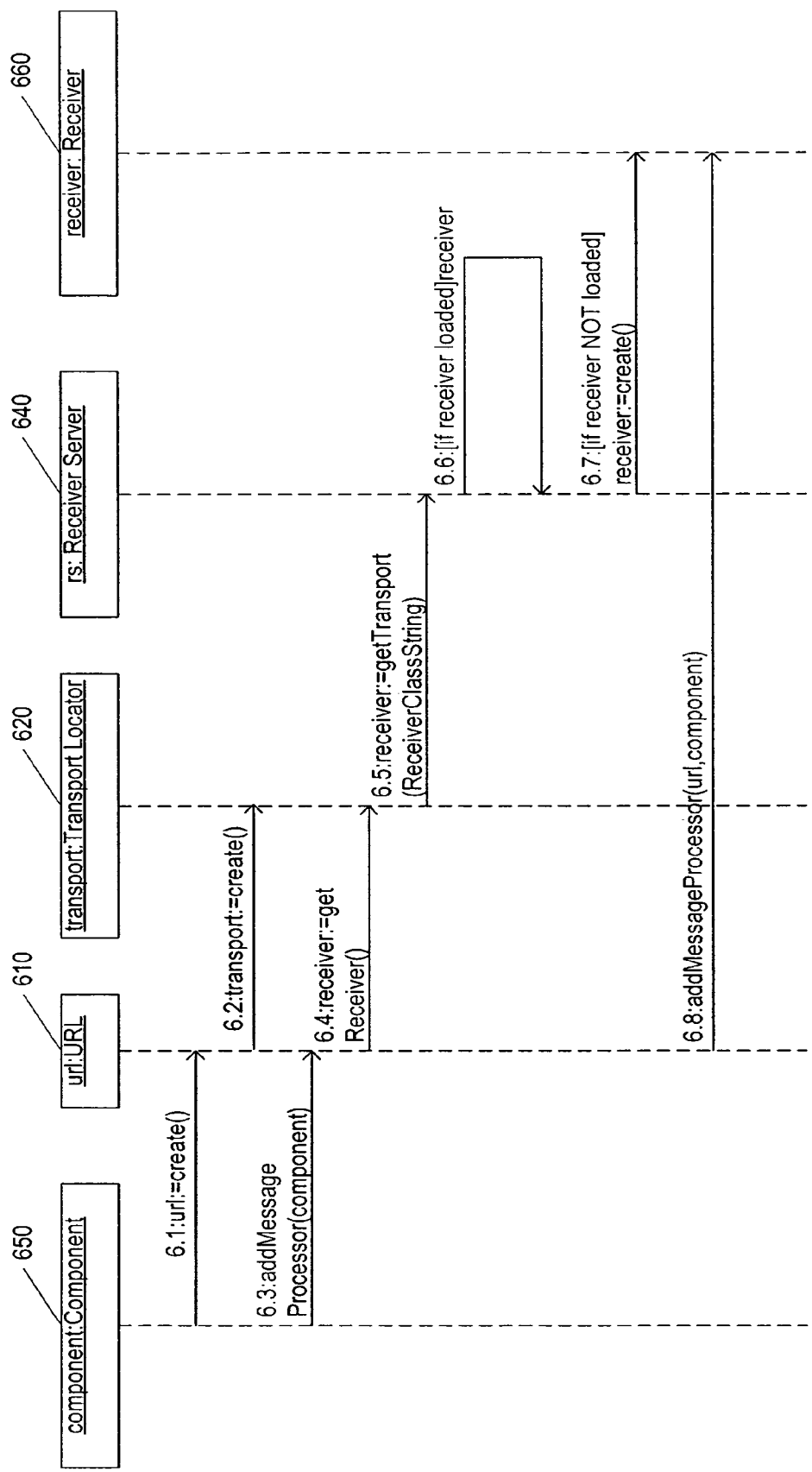
FIG. 6 is a sequence diagram showing a component registering to receive messages from other components of the software system described above.

FIG. 6 is a sequence diagram showing a component registering to receive messages from other components of the software system described above.

In action 6.1, component 650, representing a given component module of the software system, causes url 610 to be instantiated as an object of a URL class. Url 610 corresponds to a given Resource Locator 110i and represents component 650. In action 6.2, url 610 causes Transport Locator 620 to be created.

In action 6.3, component 650 sends an addMessageProcessor message, also referred to as a registration message, to url 610. The message includes the object component 650. The addMessageProcessor message indicates that component 650 wishes to become a server, i.e., to receive messages from other modules in the software system.

In action 6.4, url 610 requests a receiver object from Transport Locator 620 by sending a "getReceiver" message. The receiver object to be returned implements a common receiver transport interface, which is described in further detail below. Transport Locator 620 sends a getTransport message to Transmitter Server 630, indicating a class, named by ReceiverClassString, to be instantiated to receive messages according to the communication scheme for component 650. Receiver Server 640 determines whether the class has been instantiated.

In action 6.6, Receiver Server 640 has determined that a receiver object for the respective communication scheme has been instantiated, and provides a reference to the receiver object back to Transport Locator 620, and thus to url 610. In action 6.7, Receiver Server 640 has determined that a receiver object has not been instantiated and creates a receiver object Receiver 660, and a reference to Receiver 660 is provided back to Transport Locator 620 and to url 610.

Url 610 then sends an addMessageProcessor message to the referenced receiver object, such as Receiver 660. The addMessageProcessor message provides url 610 and a reference to component 650 to Receiver 660. The addMessageProcessor message registers component 650 as a server with the receiver object such as Receiver 660. The reference to component 650 provides a callback reference to be used when a message is later received by Receiver 660.

Figure 7:
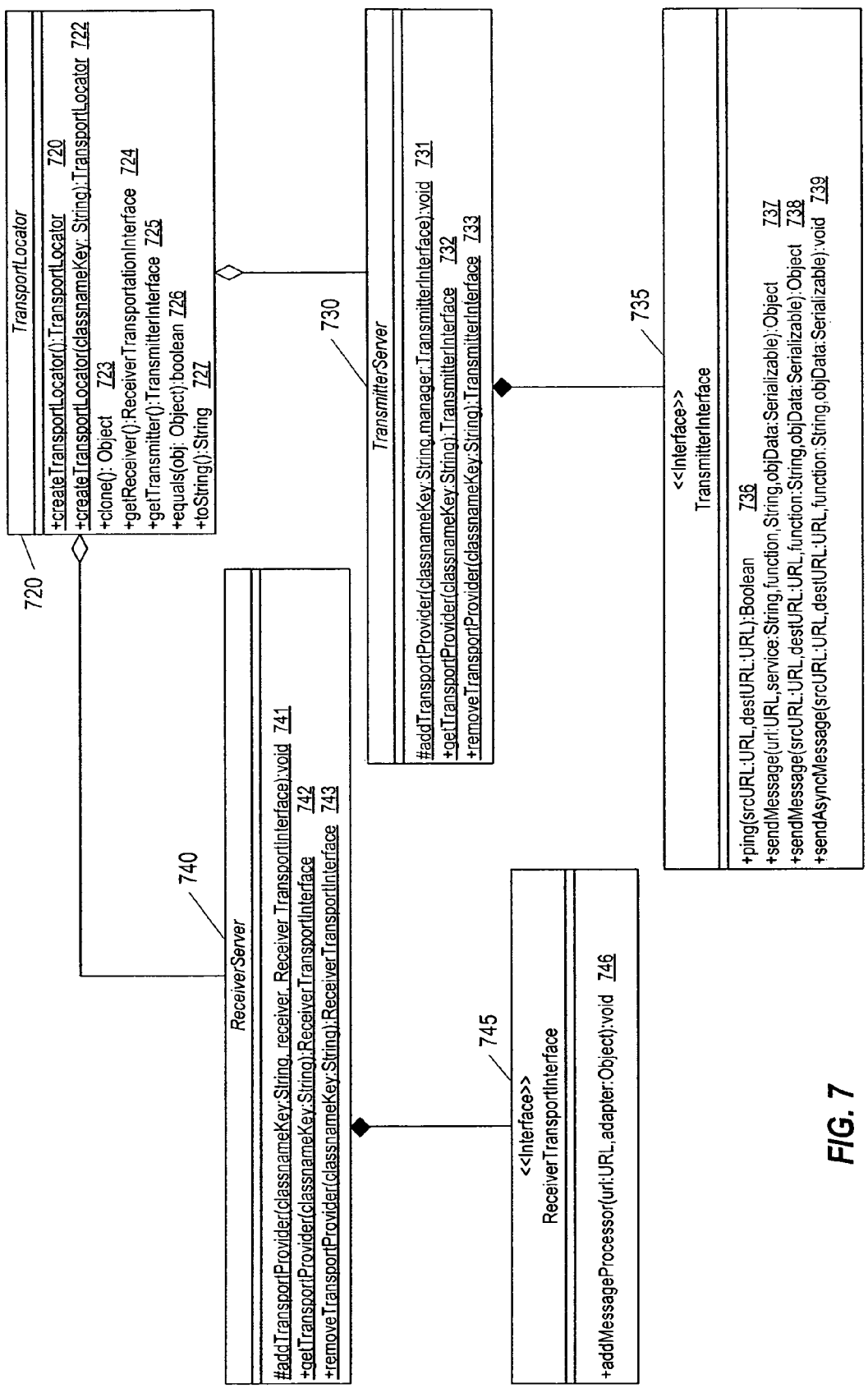
FIG. 7 is a class diagram for an example implementation of the software system described above.

FIG. 7 is a class diagram for an example implementation of the software system described above. TransportLocator class 720 defines Transport Locators, such as Transport Locators 120, 320, 420, 520, and 620 described above. ReceiverServer class 720 defines Receiver Servers such as Receiver Server 140 of FIG. 1 and Receiver Server 640 of FIG. 6. TransmitterServer class 730 defines Transmitter Servers such as Transmitter Server 130 of FIG. 1 and Transmitter Server 530 of FIG. 5.

A Transport Locator includes a Receiver Server and a Transmitter Server. A Receiver Server provides a Receiver to receive messages using a given communication scheme. A Receiver Server implements the Receiver Transport Interface 745, referred to generally herein as a common receiver transport interface. A Transmitter Server provides a transmitters to send messages using an appropriate communication scheme for the calling component. A Transmitter implements a Transmitter Interface 735.

Transport Locator class 720 includes the methods shown in Table 1.

TABLE 1

Transport Locator Class Methods

| Method name | Parameters | Function Performed | Returns |
| --- | --- | --- | --- |
| CreateTransportLocator | | Creates a Transport Locator object | Transport Locator object |
| CreateTransportLocator | ClassnameKey | Create a Transport Locator object using a particular class | Transport Locator object |

TABLE 1-continued

Transport Locator Class Methods

| Method name | Parameters | Function Performed | Returns |
| --- | --- | --- | --- |
| Clone | | Clone an object | Copy of the object |
| GetReceiver | | Get a Receiver | Receiver object that implements Receiver Transport Interface |
| GetTransmitter | | Get a Transmitter | Transmitter object that implements the Transmitter Interface |
| Equals | obj: Object | Are two objects equal? | Boolean value |
| ToString( ) | | Converts class information to a string | String |

ReceiverServer class 720 includes the methods shown below in Table 2.

TABLE 2

ReceiverServer Class Methods

| Method name | Parameters | Function Performed | Returns |
| --- | --- | --- | --- |
| AddTransportProvider | ClassnameKey Receiver (for object that implements Receiver Transport Interface) | Adds Receiver object for protocol to list of available Receivers | None |
| GetTransportProvider | ClassnameKey | Determines a receiver for the appropriate communication scheme | Receiver object implementing Receiver Transport Interface |
| RemoveTransportProvider | ClassnameKey | Determines a receiver for the appropriate communication scheme | Receiver object implementing Receiver Transport Interface |

TransmitterServer class 730 includes the methods shown below in Table 3.

TABLE 3

Transmitter Server Class Methods

| Method name | Parameters | Function Performed | Returns |
| --- | --- | --- | --- |
| AddTransportProvider | ClassnameKey Manager object | Adds object to list of transmitters for a given protocol | None |
| GetTransportProvider | ClassnameKey | Determines a Transmitter for the appropriate communication | Transmitter object implementing Transmitter |

TABLE 3-continued

Transmitter Server Class Methods

| Method name | Parameters | Function Performed | Returns |
|---|---|---|---|
| RemoveTransportProvider | ClassnameKey: String | scheme Removes Transmitter object implementing Transmitter Interface | Interface Transmitter object implementing Transmitter Interface |

ReceiverTransportInterface 745 defines methods provided by a Receiver object, particularly the addMessageProcessor message, which is used to register a module as a server or receiver of messages.

TABLE 4

Receiver Transport Interface Methods

| Method name | Parameters | Function Performed | Returns |
|---|---|---|---|
| AddMessageProcessor | Url Adapter object | Add component designated by url as a server for the appropriate communication scheme | None |

TransmitterInterface 735 defines methods provided by a Transmitter object, particularly the sendMessage method, which is used to send a message from one module to another.

TABLE 5

Transmitter Interface Methods

| Method name | Parameters | Function Performed | Returns |
|---|---|---|---|
| Ping | SrcURL DestURL Function ObjData | Determines whether Destination URL is active | Boolean |
| SendMessage | url service function objData | Calls service to send message to url | Reply to message (depends upon function of service called) |
| SendMessage | SrcURL DestURL Function ObjData | Determine transmitter to send message to url | Reply object referencing transmitter |
| SendAsyncMessage | SrcURL DestURL Function ObjData | Sends asynchronous message | None |

Figure 8:
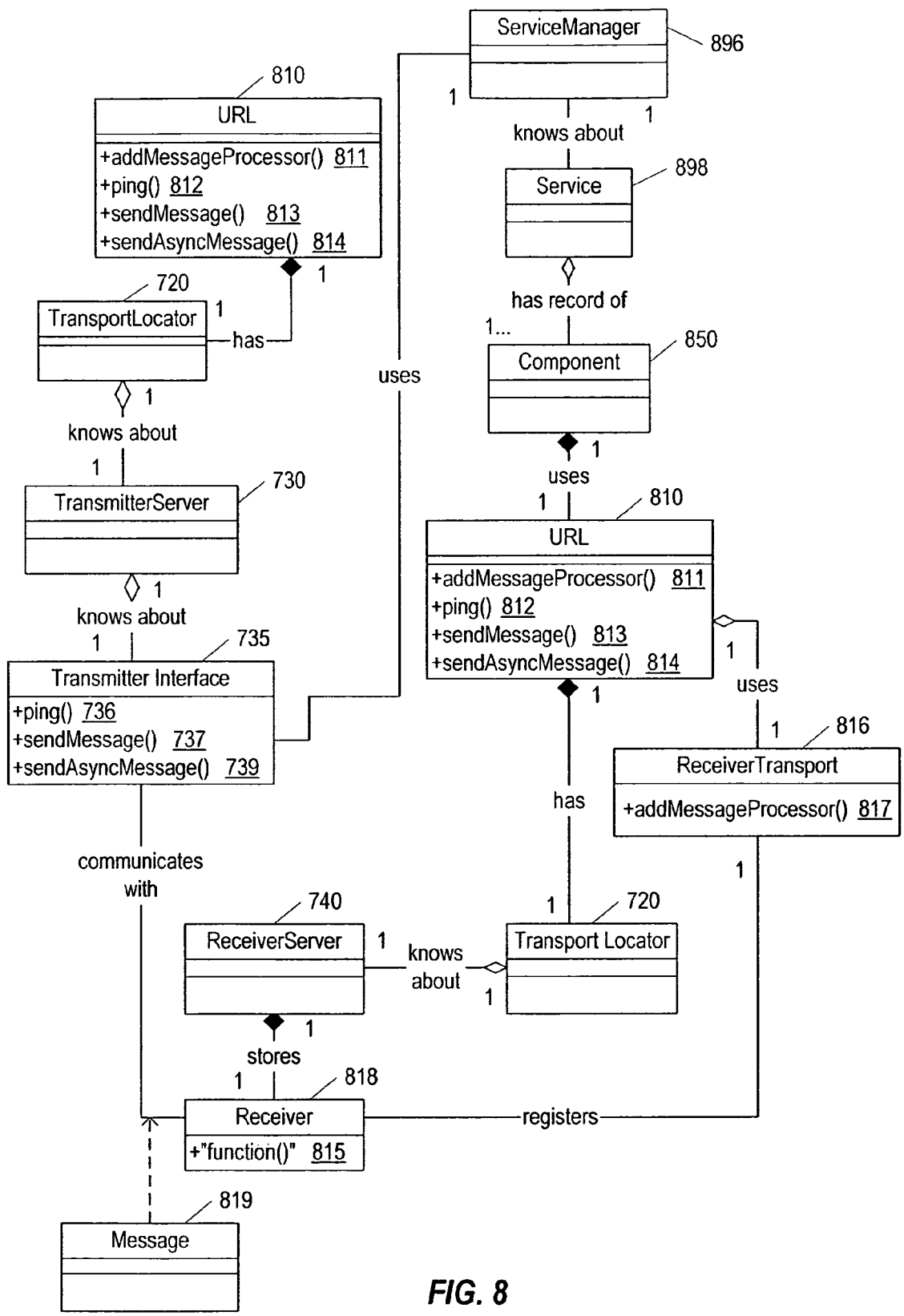
FIG. 8 is a detailed class diagram of the classes involved in sending a message within an example implementation of the software system described above.

FIG. 8 is a detailed class diagram of the classes involved in sending a message within an example implementation of the software system described above.

Class URL 810 defines Resource Locators such as Resource Locators 110*i*, 110*j*, and 110*k* of FIG. 1, as well as urls 310, 410, 510, and 610 of FIGS. 3, 4, 5 and 6, respectively. Class URL 810 includes the addMessageProcessor method 811 to communicate with class ReceiverTransport 816, which has a corresponding addMessageProcessor method 817. Class URL 810 also includes ping method 812, sendMessage method 813, and sendAsyncMessage method 814 to communicate with class Transmitter 870, which has corresponding ping method 871, sendMessage method 872, and sendAsyncMessage method 873.

A URL instance of class URL 810 uses a Transport Locator instance of class TransportLocator 720 to send and receive messages. Each URL instance has a 1:1 relationship with a Transport Locator instance. An instance of Transport Locator class 720 knows about a Transmitter Server instance of class TransmitterServer 730 that can provide an instance of class Transmitter 870 to provide scheme-specific communication according to the communication scheme needed to communicate with the URL instance.

Similarly, an instance of Transport Locator class 720 knows about a Receiver Server instance of class ReceiverServer 740 that can provide an instance of Receiver 818. The instance of Transport Locator class 720 calls function 815, and Receiver Server provides a reference to Receiver 818. Message 819 is communicated between the instance of class Transmitter 870 and the instance of class Receiver 818. The instance of Receiver 818 registers with an instance of ReceiverTransport 816, which corresponds to Receiver Transport Interface 745 of FIG. 7. An instance of class Receiver Transport 816 provides scheme-specific communication according to the communication scheme needed to communicate with the URL instance.

An instance of class Transmitter 870 provides the destination for a message it sends in the form of a URL or by calling a service. FIG. 8 shows that an instance of Transmitter 870 calls an instance of class ServiceManager 896 to request a service. The instance of class ServiceManager 896 knows about the available services, which are instances of class Service 898. Each service instance has a record of at least one instance of class Component 850. A component of the software system is represented as an instance of class Component 850. Finally, the component has a corresponding instance of class URL 810.

Figure 9:
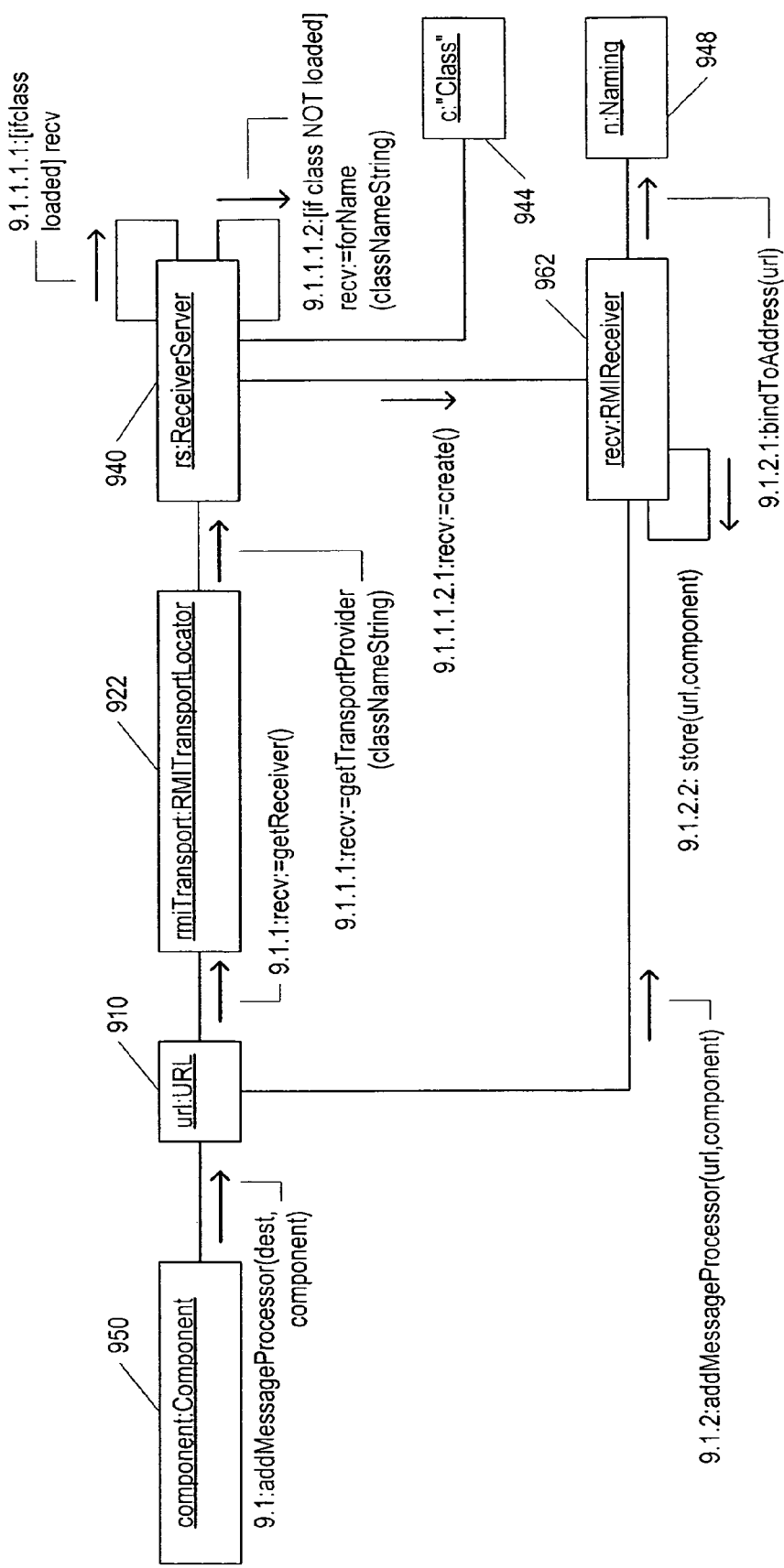
FIG. 9 is a collaboration diagram showing a component registering to receive messages from other components of the software system described above using an RMI communication scheme.

FIG. 9 is a collaboration diagram showing a component registering to receive messages from other components of the software system described above using an RMI communication scheme. In action 9.1, component 950 sends an addMessageProcessor message, also referred to as a registration message, to url 910. The message includes a destination URL and an object, component 950. The addMessageProcessor message indicates that component 950 wishes to become a server, i.e., to receive messages from other modules in the software system.

In action 9.1.1, url 910 requests a receiver object from RMI Transport Locator 922 by sending a "getReceiver" message. The receiver object implements a common receiver transport interface. In action 9.1.1.1, RMI Transport Locator 922 sends a "getTransportProvider" message to Receiver Server 940, indicating a class, classNameString, to be instantiated that implements the Receiver Transport Interface for RMI. Receiver Server 940 determines whether the class has been instantiated. In action 9.1.1.1.1, Receiver Server 940 has determined that a receiver object for the respective communication scheme has been instantiated, and provides a reference to the existing receiver object back to RMI Transport Locator 922, and thus to url 910. In action 9.1.1.1.2, Receiver Server 940 has determined that a receiver object has not been instantiated and invokes a forName method of the ClassNameString RMI Receiver Transport Interface to create an instance of the class corresponding to the ClassNameString, designated as "Class" 944. In action 9.1.1.2.1, Receiver Server 940 creates a receiver object RMI Receiver 962. A reference to the receiver object, such as RMI Receiver 962, is provided back to RMI Transport Locator 922 and to url 910.

In action 9.1.2, url 910 sends an addMessageProcessor message to the referenced receiver object, such as RMI Receiver 962, providing url 910 and component 950. In action 9.1.2.1, RMI Receiver 962 registers with an RMI naming service represented by Naming 948. In action 9.1.2.2, url 910 and component 950 are stored as part of a cache associated with RMI Receiver 962. Both RMI Receiver 962 and Naming 948 are implementation details, and other RMI embodiments may implement these functions differently.

Figure 10:
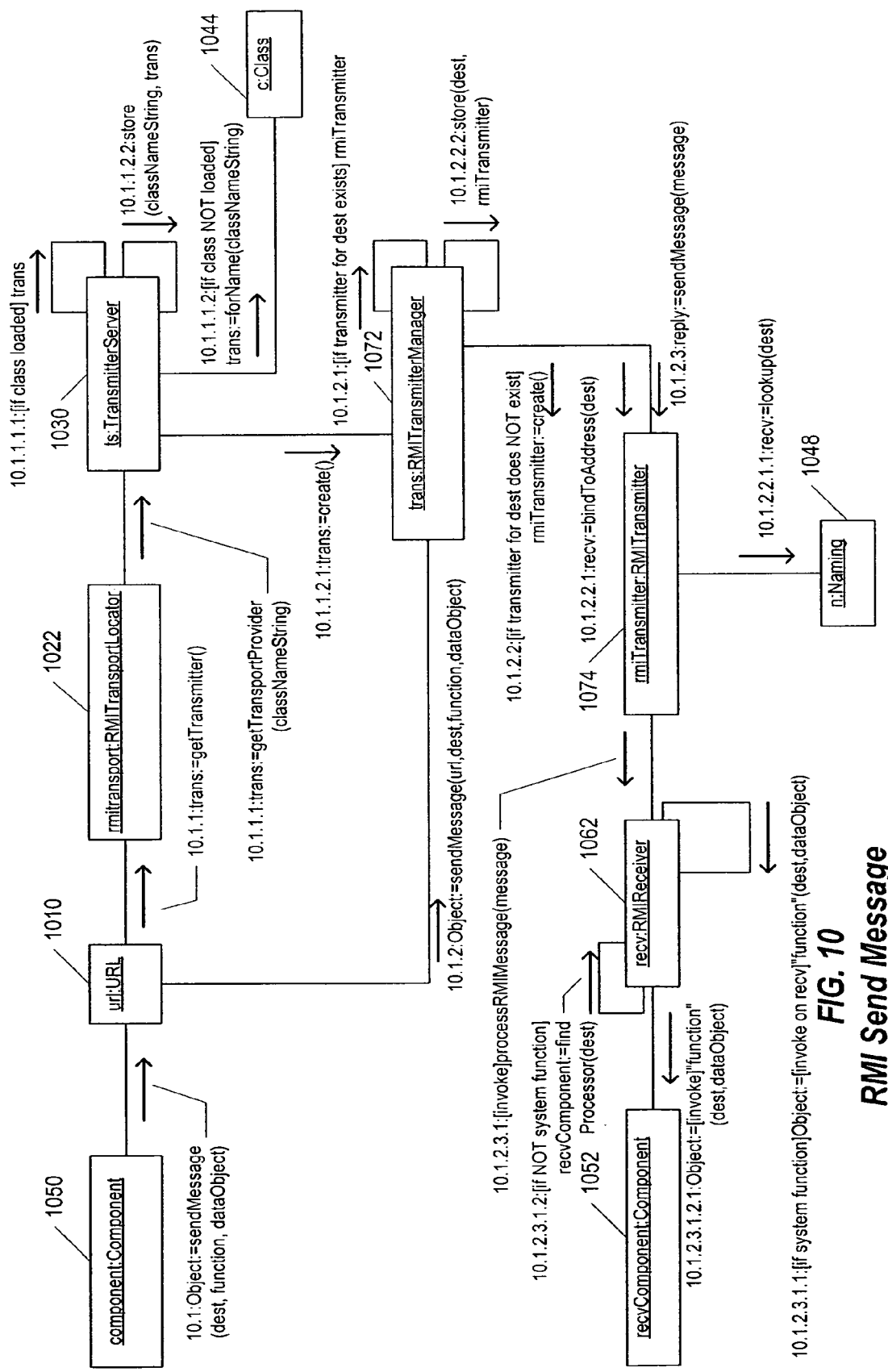
FIG. 10 is a collaboration diagram showing sending a message between components of the software system described above using an RMI communication scheme.

FIG. 10 is a collaboration diagram showing sending a message between modules of the software system described above using an RMI communication scheme.

In action 10.1, component 1050, representing a given component module of the software system, sends a message. The message includes a destination, usually in the form of a Resource Locator 110*i* or a call to a service; a function to be performed; and a data object. The message is sent to url 1010, which is an instantiation of a URL class, where the url corresponds to a given Resource Locator 110*i* supporting the communication scheme used by component 1050.

In action 10.1.1, url 1010 sends a "getTransmitter" message to RMI Transport Locator 1022. RMI Transport Locator 1022 determines whether an object has been instantiated to serve as a transmitter according to the communication scheme for component 1050. In action 10.1.1.1, RMI Transport Locator 1022 sends a "getTransportProvider" message to Transmitter Server 1030, passing a classNameString naming the class for which a transport provider is needed.

In this example, a transmitter manager is included to include information to manage all transmitters. In action 10.1.1.1.1, Transmitter Server 1030 has determined that a transmitter manager object for the respective communication scheme has been instantiated and provides a reference to the transmitter manager object 1072. In action 10.1.1.1.2, Transmitter Server 1030 has determined that a transmitter manager object for the respective communication scheme has not been instantiated, and invokes a forName method of the RMI Transmitter Interface to create an instance of the class corresponding to the ClassNameString, designated as Class 1044.

In action 10.1.1.2.1, Transmitter Server 1030 has determined that a transmitter manager has not been loaded and creates RMI Transmitter Manager 1072. Transmitter Server provides a reference to the transmitter manager, such as RMI Transmitter Manager 1072, back to RMI Transport Locator 1022 and url 1010.

In action 10.1.2, url 1010 sends a message to the referenced transmitter manager, such as RMI Transmitter Manager 1072. The message includes url 1010, as well as the destination, function, and dataObject provided by component 1050 in the original message in action 10.1. In action 10.1.2.1, RMI Transmitter Manager 1072 determines whether an RMI transmitter object for the destination exists. If so, RMI Transmitter Manager returns a reference to the RMI transmitter object. If not, in action 10.1.2.2, RMI Transmitter manager 1072 creates an RMI transmitter object, RMI Transmitter 1074.

In action 10.1.2.2.1, RMI Receiver 1062 registers itself with an RMI naming service representing by Naming 1048. In action 10.1.2.2.1.1, the RMI naming service Naming 1048 looks up the address corresponding to the destination parameter, in a data store such as data store 104 of FIG. 1. In action 10.1.2.2.2, RMI Transmitter Manager 1072 stores the destination and reference to RMI transmitter.

In action 10.1.2.3, RMI Transmitter Manager 1072 sends a message to RMI Transmitter 1074. The message includes the url, destination, function and dataObject parameters passed by url 1010 in action 10.1.2. In action 10.1.2.3.1, a processRMIMessage method is invoked, passing the message. In action 10.1.2.3.1.1, if the function included in the message is a system function (a function not defined by a component), the function of RMI Receiver 1062 is invoked, passing the destination and the dataObject. In action 10.1.2.3.1.2, if the function included in the message is not a system function, a findProcessor method is called, passing the destination parameter. The findProcessor message is used to determine the Resource Locator 110*i* for the component to call. A reference to RecvComponent 1052 is returned as a result of the findProcessor call. In action 10.1.2.3.1.2.1, RMI Receiver 1062 invokes the function of recvComponent 1052, providing the destination and dataObject parameters. The reply to the function call produced in action 10.1.2.3.1.2.1 is returned to RMI Receiver 1062, RMI Transmitter 1074, RMI Transmitter Manager 1072, url 1010, and component 1050 as a reply to the original sendMessage in action 10.1.

Figure 11:
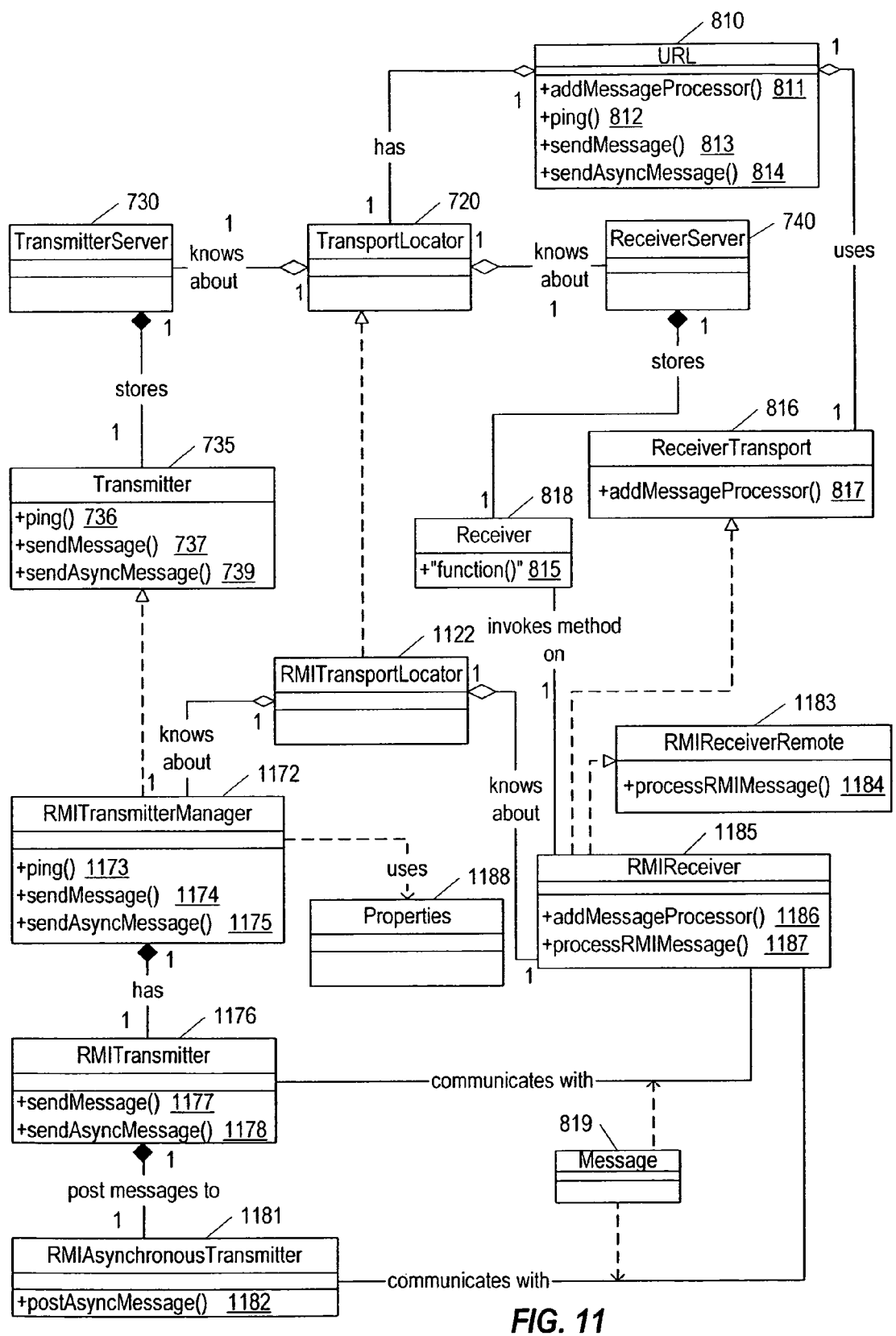
FIG. 11 is a detailed class diagram of the classes involved in the communications for the example implementation of the software system of FIGS. 9 and 10.

FIG. 11 is a detailed class diagram of the classes involved in receiving a message within an example implementation of the software system of the foregoing Figures. In this example, Java Remote Method Invocation (RMI) is used for communication between modules of the software system. Classes TransmitterServer 730, TransportLocator 720, URL 810, ReceiverServer 740, Transmitter 870, Receiver 818, and ReceiverTransport 816 are explained above with reference to FIGS. 7 and 8.

The classes implementing transmission and receipt of messages shown in FIG. 11 also include classes specifically implemented for RMI, such as RMITransportLocator 1122, RMITransmitterManager 1172, RMITransmitter 1176, RMIAsynchronousTransmitter 1181, RMIReceiver 1185, and RMIReceiverRemote 1183.

Class RMITransportLocator 1122 is a subclass of class TransportLocator 720. An object instantiating RMITransportLocator 1122 communicates with an object instantiating class RMIReceiver 1185 that can register components as RMI servers. An object instantiating class RMITransportLocator 1122 also communicates with an object instantiating class RMITransmitterManager 1172 that can transmit messages according to the RMI communication scheme.

Classes RMIReceiverRemote 1183 and ReceiverTransport 816 are subclasses of class RMIReceiver 1185. Class RMIReceiver 1185 has two methods, addMessageProcessor method 1186 and processRMIMessage method 1187. Each of these methods are implemented as subclasses. Subclass ReceiverTransport 816 implements the addMessageProcessor method 817, and subclass RMIReceiverRemote 1183 implements processRMIMessage method 1184.

An object instantiating class RMIReceiver 1185 can invoke a function 815 on an object instantiating class Receiver 818. A Receiver Server instantiating class ReceiverServer 740 stores references to objects that are instantiations of class Receiver 818.

Class RMITransmitterManager 1172 is a subclass of class Transmitter 870. Class RMITransmitterManager 1172 includes methods ping 1173, sendMessage 1174, and sendAsyncMessage 1175. An object instantiating class RMITransmitterManager 1172 uses class Properties 1188 to determine properties of a given transmitter.

An RMI Transmitter Manager has a corresponding transmitter object instantiating class RMITransmitter 1176. An RMI transmitter object sends RMI messages to components of the software system using methods sendMessage 1177 and sendAsyncMessage 1178.

Both an RMI transmitter object instantiating class RMITransmitter 1176 and an RMI Asynchronous Transmitter instantiating class RMIAsynchronousTransmitter 1181 communicate with an RMI receiver object instantiating class RMIReceiver 1185 via a message object instantiating class Message 819. An object instantiating class RMIAsynchronousTransmitter posts messages to an RMI transmitter object instantiating class RMITransmitter 1176. The RMI transmitter object sends the asynchronous message to a receiver object instantiating class RMIReceiver 1185.

One of ordinary skill in the art also will recognize that the data flows and methods described above with regard to the Figures can be automated using an apparatus or computer system.

Figure 12:
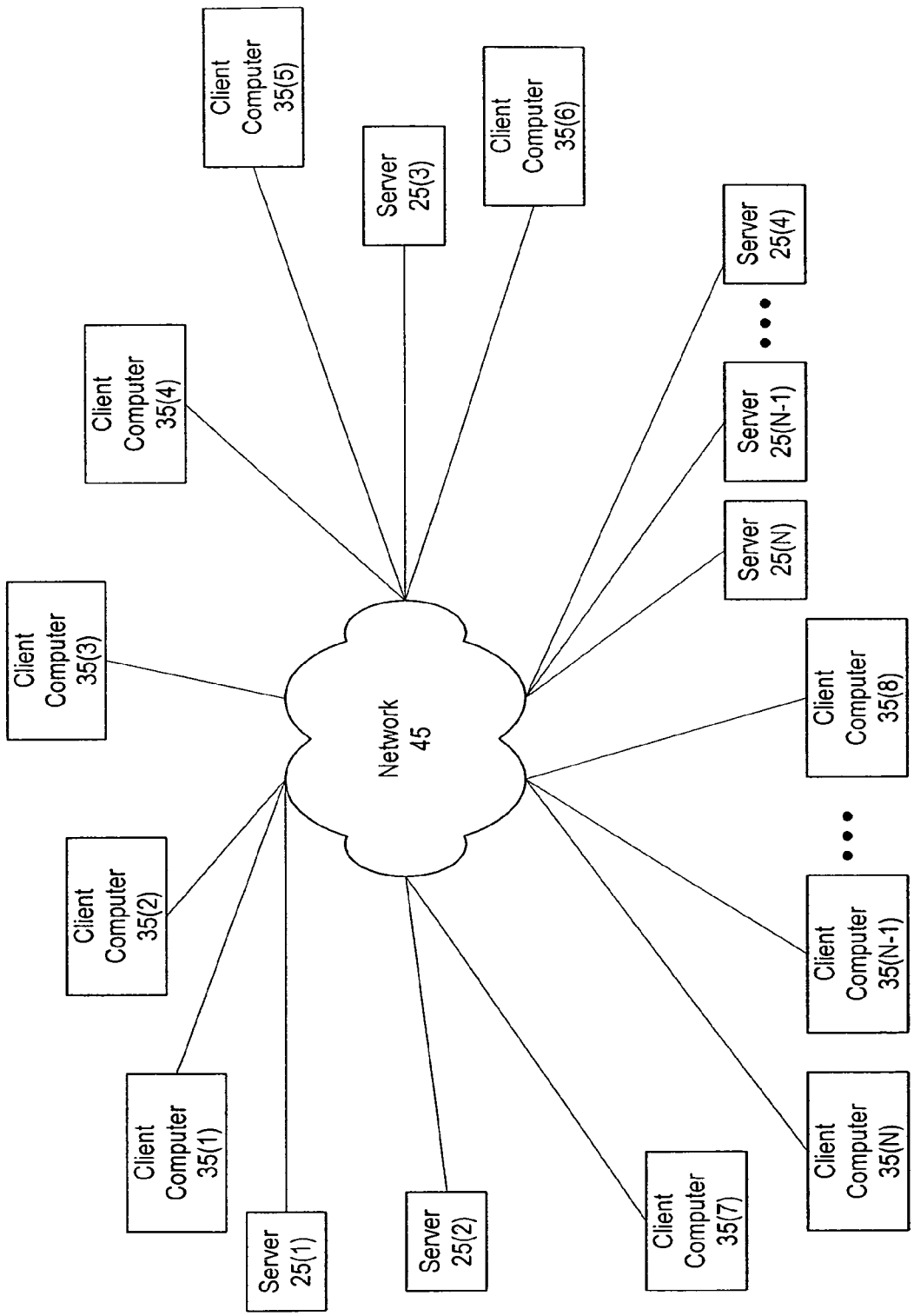
FIG. 12 is a block diagram illustrating a network environment in which a software system according to embodiments of the present invention may be practiced.

FIG. 12 is a block diagram illustrating a network environment in which a software system according to the present invention may be practiced. As is illustrated in FIG. 12, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service). Client computers 35(1)-(N) access servers 25(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 35(1)-(N).

It will be noted that the variable identifier "N" is used in several instances in FIG. 12 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

One or more of client computers 35(1)-(N) and/or one or more of servers 25(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 35(1)-(N) is shown in detail in FIG. 13.

A computer system hosting an application of the software system described herein may be, for example, a computer system of any appropriate design, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices), which are coupled to the system processor and perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system is shown in detail in FIG. 13.

Figure 13:
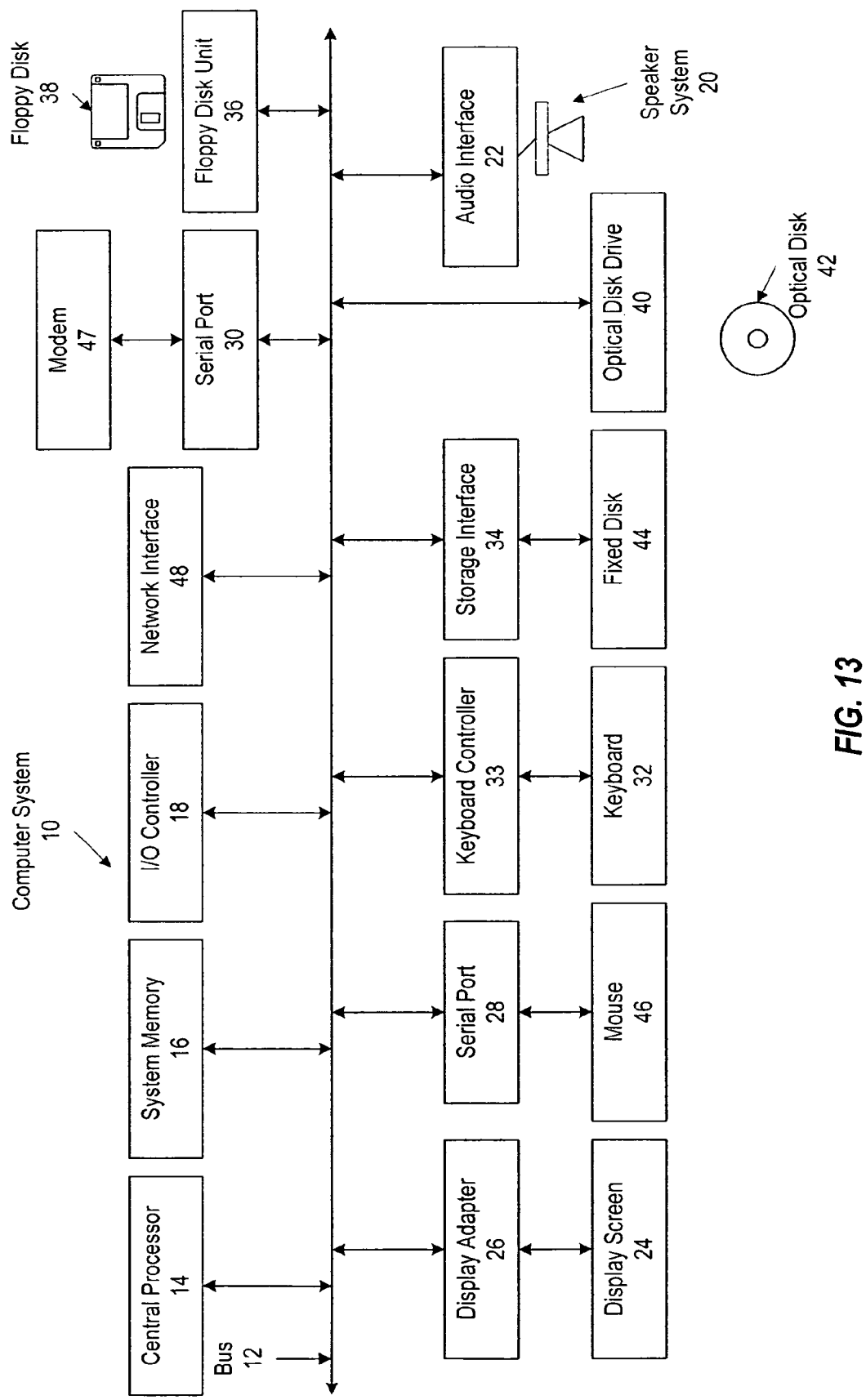
FIG. 13 is a block diagram illustrating a computer system suitable for implementing embodiments of the present invention.

FIG. 13 depicts a block diagram of a computer system 10 suitable for implementing the present invention, and example of one or more of client computers 35(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and an optical disk drive 40 operative to receive an optical disk 42. Also included are a mouse 46 (or other point-and-click device, coupled to bus 12 via serial port 28), a modem 47 (coupled to bus 12 via serial port 30) and a network interface 48 (coupled directly to bus 12) for connecting to a network (not shown) providing interconnectivity for software system applications.

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., optical disk drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 13 to be present to practice the present invention. The devices and subsystems may be interconnected in different ways from that shown in FIG. 13. The operation of a computer system such as that shown in FIG. 13 is readily known in the art and is not discussed in detail in this application. Code to implement the present invention may be stored in computer-readable storage media such as one or more of system memory 16, fixed disk 44, optical disk 42, or floppy disk 38. Additionally, computer system 10 may be any kind of computing device, and so includes personal data assistants (PDAs), network appliance, X-window terminal or other such computing device. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Figure 14:
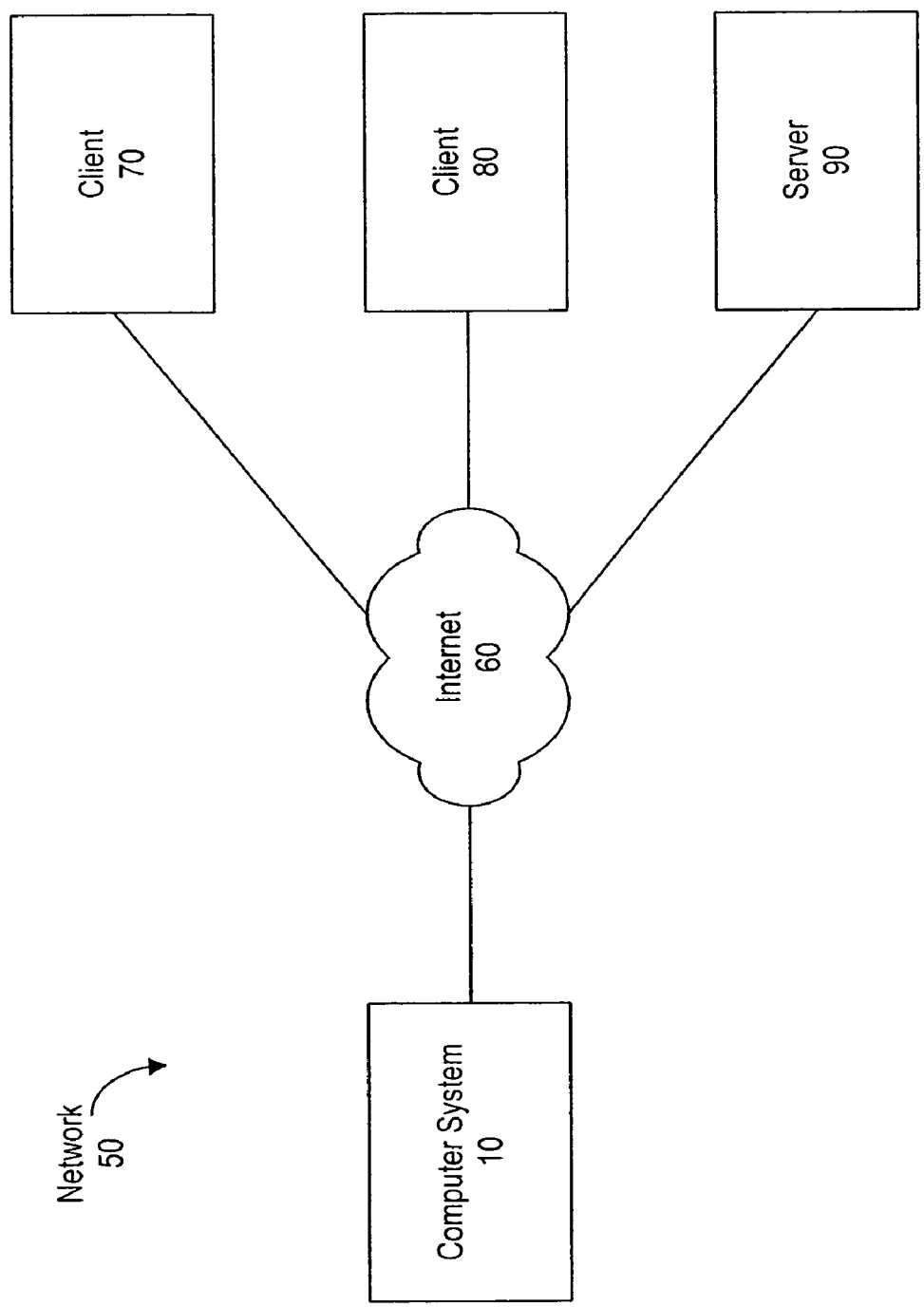
FIG. 14 is a block diagram illustrating the interconnection of the computer system of FIG. 13 to client and host systems.

FIG. 14 is a block diagram illustrating the interconnection of the computer system of FIG. 13 to client and host systems. FIG. 14 is a block diagram depicting a network 50 in which computer system 10 is coupled to an internet 60, which is coupled, in turn, to client systems 70 and 80, as well as a server 90. Internet 60 (e.g., the Internet) is also capable of coupling client systems 70 and 80 and server 90 to one another. With reference to computer system 10, modem 47, network interface 48 or some other method can be used to provide connectivity from computer system 10 to Internet 60. Computer system 10, client system 70 and client system 80 are able to access information on server 90 using, for example, a web browser (not shown). Such a web browser allows computer system 10, as well as client systems 70 and 80, to access data on server 90 representing the pages of a website hosted on server 90. Protocols for exchanging data via the Internet are well known to those skilled in the art. Although FIG. 14 depicts the use of the Internet for exchanging data, the present invention is not limited to the Internet or any particular network-based environment.

Referring to FIGS. 12, 13 and 14, a browser running on computer system 10 employs a TCP/IP connection to pass a request to server 40, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the HTML file using local resources (e.g., fonts and colors).

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

The present invention provides many advantages. It enables applications using different communication schemes to use a common interface to communicate without the need to modify the application code when a new communication scheme is introduced to the software system.

Additional advantages include, but are not limited to, more simplistic communication between clients and servers, thereby reducing maintenance and support costs.

Other Embodiments

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, data collaboration diagrams, sequence diagrams, state diagrams and examples. It will be understood by those within the art that each block diagram component, action, state, operation and/or element illustrated by the use of examples can be implemented, individually and/or collectively, by a wide range of hardware, software, firmware, or any combination thereof. However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. A method comprising:
   obtaining a message from a first component of a software system;
   identifying a module to handle scheme-specific communication of the message; and
   using the module for communicating the message from the first component to a second component of the software system, the communicating the message including using a first resource locator to identify the first component and using a second resource locator to identify the second component, the first resource locator including a first resource locator communication scheme indication portion, a first resource locator network node name indication portion, a first resource locator port identifier indication portion and a first resource locator path indication portion, the second resource locator including a second resource locator communication scheme indication portion, a second resource locator network node name indication portion, a second resource locator port identifier indication portion and a second resource locator path indication portion.

2. The method of claim 1 wherein
   the communicating the message comprises using communication scheme-specific programming code of the module, wherein
      the first component does not comprise the communication scheme-specific programming codes; and
      the second component does not comprise the communication scheme-specific programming code.

3. The method of claim 1 wherein
   the using the module for communicating the message comprises at least one of a group consisting of the following:
      using a communication scheme-specific transmitter for transmitting the message; and
      using a communication scheme-specific receiver for receiving the message.

4. The method of claim 1 wherein
   the identifying the module comprises calling a communication scheme handler to identify the module.

5. The method of claim 4 wherein
   the identifying the module comprises at least one of a group consisting of the following:
      requesting a transmitter server to identify the module; and
      requesting a receiver server to identify the module.

6. The method of claim 1 wherein
   the communicating the message comprises using a common interface for the first component and the second component.

7. The method of claim 1 wherein
   the communicating the message comprises:
      using a first communication scheme from the first resource locator for communicating with the first component; and
      using a second communication scheme from the second resource locator for communicating with the second component.

8. The method of claim 7 wherein
   the first and second communication schemes are the same.

9. A software system comprising:
   a common interface, executing on a processor, to communicate between a first component of a software system and a second component of the software system; and
   a communication scheme handler, executing on a processor, to identify a module to handle scheme-specific communication between the first component and the second component;
   a first resource locator, executing on a processor, for the first component, the first resource locator including a first resource locator communication scheme indication portion, a first resource locator network node name indication portion, a first resource locator port identifier indication portion and a first resource locator path indication portion; and
   a second resource locator, executing on a processor, for the second component, the second resource locator including a second resource locator communication scheme indication portion, a second resource locator network node name indication portion, a second resource locator port identifier indication portion and a second resource locator path indication portion.

10. The software system of claim 9 wherein
    the module comprises communication scheme-specific programming code;
    the first component does not comprise communication scheme-specific programming code; and
    the second module does not comprise communication scheme-specific programming code.

11. The software system of claim 9, wherein
    the first component uses the common interface to request the module to communicate a first message to the second component; and
    the second component uses the common interface to request the module to communicate a second message to the first component.

12. The software system of claim 9 wherein the module corresponds to at least one of a group consisting of the following:
    a communication scheme-specific transmitter; and
    a communication scheme-specific receiver.

13. The software system of claim 9 further comprising:
    a communication scheme handler to identify the module.

14. The software system of claim 9 further comprising:
    a communication scheme handler to identify the module using at least one of a group consisting of the following:
    a transmitter server; and
    a receiver server.

15. The software system of claim 9 wherein
    the first resource locator comprises a first communication scheme for the first component; and
    the second resource locator comprises a second communication scheme for the second component.

16. A computer program product comprising: obtaining instructions to obtain a message from a first component of a software system; identifying instructions to identify a module to handle scheme-specific communication of the message;
    using instructions to use the module to communicate the message from the first component to a second component of the software system, the using instructions including resource locator instructions to use a first resource locator to identify the first component and use a second resource locator to identify the second component, the first resource locator including a first resource locator communication scheme indication portion, a first resource locator network node name indication portion, a first resource locator port identifier indication portion and a first resource locator path indication portion, the second resource locator including a second resource locator communication scheme indication portion, a second resource locator network node name indication portion, a second resource locator port identifier indication portion and a second resource locator path indication portion; and a non-transitory computer-readable medium to store the obtaining instructions, the identifying instructions and the using instructions.

17. The computer program product of claim 16 wherein the using instructions comprise:

scheme-specific instructions to use communication scheme-specific programming code of the module, wherein the first component does not comprise the communication scheme-specific programming code; and the second component does not comprise the communication scheme-specific programming code; and the non-transitory computer readable medium further stores the scheme-specific instructions.

18. The computer program product of claim 16 wherein the using instructions comprise:

transmitting instructions to use a communication scheme-specific transmitter to transmit the message; and receiving instructions to use a communication scheme-specific receiver to receive the message; and the non-transitory computer-readable medium further stores the transmitting instructions and the receiving instructions.

19. The computer program product of claim 16 wherein the identifying instructions comprise:

calling instructions to call a communication scheme handler to identify the module; and the non-transitory computer-readable medium further stores the calling instructions.

20. The computer program product of claim 16 wherein the identifying instructions comprise:

transmitter requesting instructions to request a transmitter server to identify the module; and receiver requesting instructions to request a receiver server to identify the module; and the computer-readable medium further stores the transmitter requesting instructions and the receiver requesting instructions.

21. The computer program product of claim 16 wherein the instructions comprise:

interface using instructions to use a common interface to communicate with the first component and the second component; and the non-transitory computer-readable medium further stores the interface instructions.

22. The computer program product of claim 16 wherein the using instructions further comprise:

scheme instructions to
use a first communication scheme from the first resource locator to communicate with the first component; and
use a second communication scheme from the second resource locator to communicate with the second component.

23. The computer program product of claim 22 wherein the first and second communication schemes are the same.

* * * * *